US010778546B2

(12) United States Patent
Fersman et al.

(10) Patent No.: US 10,778,546 B2
(45) Date of Patent: Sep. 15, 2020

(54) AGGREGATE ENERGY CONSUMPTION ACROSS A NETWORK

(71) Applicant: TELEFONAKTIEBOLAGET LM ERICSSON (PUBL), Stockholm (SE)

(72) Inventors: Elena Fersman, Stockholm (SE); Hongxin Liang, Upplands Väsby (SE); Patrik Oldsberg, Tyresö (SE); Gabór Stikkel, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 544 days.

(21) Appl. No.: 15/508,750

(22) PCT Filed: Sep. 9, 2014

(86) PCT No.: PCT/SE2014/051033
§ 371 (c)(1),
(2) Date: Mar. 3, 2017

(87) PCT Pub. No.: WO2016/039671
PCT Pub. Date: Mar. 17, 2016

(65) Prior Publication Data
US 2018/0241650 A1 Aug. 23, 2018

(51) Int. Cl.
*H04L 12/26* (2006.01)
*H04L 12/24* (2006.01)
*H04L 29/06* (2006.01)
(52) U.S. Cl.
CPC .......... *H04L 43/08* (2013.01); *H04L 43/04* (2013.01); *H04L 41/0833* (2013.01); *H04L 69/22* (2013.01)
(58) Field of Classification Search
CPC ..... H04L 41/0833; H04L 43/04; H04L 69/22; H04L 43/08
(Continued)

(56) References Cited

U.S. PATENT DOCUMENTS 5,781,534 A   7/1998 Perlman et al.
8,954,609 B1 * 2/2015 Holleman ............ H04J 3/0667
                                                      709/203
(Continued)

FOREIGN PATENT DOCUMENTS

EP  1931113 A1  6/2008
EP  2579517 A1  4/2013

OTHER PUBLICATIONS

International Search Report and Written Opinion dated Mar. 24, 2016, issued in Application No. PCT/SE2014/051033, 12 pages.
(Continued)

*Primary Examiner* — Mark H Rinehart
*Assistant Examiner* — Kokou R Detse
(74) *Attorney, Agent, or Firm* — Rothwell, Figg, Ernst & Manbeck, P.C.

(57) ABSTRACT

This disclosure relates to determining aggregate energy consumption associated with sending content (e.g., media content, such as a video file, audio file, etc.) across a network. For example, node 106A receives a network packet from server 104 and forwards the packet to node 106B. Node 106A determines an amount of energy consumed by node 106A in processing the packet. Node 106A adds this determined energy consumption value to an energy consumption value in a header within the network packet to produce an aggregate energy consumption value and send the network packet with the aggregate energy consumption value to node 106B. Node 106B receives the network packet from node 106a. Node 106B determines an amount of energy consumed by node 106B in processing the packet. Node 106B adds this determined energy consumption value to the energy consumption value in the header within the network packet to produce an aggregate energy consumption
(Continued)

value and send the network packet with the aggregate energy consumption value to node 106G. Node 106G also adds its determined energy consumption to the aggregate energy consumption value received from node 106B. Node 106G sends the packet with the further updated aggregate energy consumption value to communication device 102. After communication device 102 receives the packet, a process running on communication device 102 extracts and stores the aggregate energy consumption value. When communication device 102 receives another packet related to the first packet, communication device 102 extracts, from this second packet, the aggregated energy consumption and sums this new aggregated energy consumption value with the stored aggregated energy consumption value in order to determine a total energy consumption. Thus, the present disclosure provides for determining an aggregate energy consumption value as well providing users of a network with information that makes them aware of how much energy is being consumed to transmit and/or receive content through the network. The energy consumption value for network nodes that cannot determine the amount of energy needed to send one or more network packets may be estimated.

12 Claims, 9 Drawing Sheets

(58) Field of Classification Search
USPC .......................................................... 370/252
See application file for complete search history.

(56) References Cited

U.S. PATENT DOCUMENTS

| 9,231,852 B2 | 1/2016 | Zhang et al. |
| 2011/0019560 A1* | 1/2011 | Karaoguz ............. H04L 45/125 370/252 |
| 2013/0003574 A1* | 1/2013 | Hayashi .................. H04L 12/10 370/252 |
| 2013/0290523 A1* | 10/2013 | Komatsuzaki .......... H04L 43/04 709/224 |
| 2015/0363110 A1* | 12/2015 | Batra .................... G06F 3/0604 711/147 |

OTHER PUBLICATIONS

International Preliminary Report on Patentability dated Mar. 14, 2017, issued in Application No. PCT/SE2014/051033, 10 pages.
Vishwanath, A., et al., "Estimating the energy consumption for packet processing, storage and switching in optical-IP routers", Optical Fiber Communication Conference and Exposition and the National Fiber Optic Engineers Conference (OFC/NFOEC), Technical Digest © 2013, pp. 1-3, Mar. 17-21, 2013.
http://en.wikipedia.org/wiki/Type-length-value, Aug. 16, 2014, 2 pages.
Indian Office Action dated Jun. 27, 2019 issued in Indian Application No. 201717004423. (6 pages).

* cited by examiner

AGGREGATE ENERGY CONSUMPTION ACROSS A NETWORK

CROSS REFERENCE TO RELATED APPLICATION

This application is a 35 U.S.C. § 371 National Stage of International Application No. PCT/SE2014/051033, filed Sep. 9, 2014, designating the United States, the disclosure of which is incorporated by reference.

TECHNICAL FIELD

This disclosure relates to determining energy consumption associated with sending media content across a network.

BACKGROUND

A network (e.g., Internet, Extranet, Intranet, etc.) can be composed of multiple network devices (e.g., switches, bridges, routers, etc.) that are used to transmit content from one device (e.g., a computer, server, user equipment) to another device.

A communication device (e.g., laptop, smart phone, etc.) may, for example, request content from another communication device (e.g., media server), via the network. Upon receiving the request, the media server may send the requested content (e.g., graphics, text, video, audio, etc.) as one or more packets that are transmitted through the network devices. The network devices may forward the packets to other network device so as to allow for the transmission of the content from the media server to the communication device.

Since each network device uses a particular amount of power to process the data packets, an amount of energy will be consumed to transmit the entire content across a network. There are no existing solutions that provide for determining the total amount of energy consumed for transmitting information across a network.

SUMMARY

According to exemplary embodiments, a method is provided for determining an aggregate energy consumption value associated with sending a network packet across a network. The method includes a packet processing and forwarding node receiving a network packet comprising an energy consumption value. The method further includes determining, by the packet processing and forwarding node, an amount of energy consumed by the packet processing and forwarding node with respect to the received network packet. The method further includes generating, by the packet processing and forwarding node, an aggregate energy consumption value using the energy consumption value and a value corresponding to the determined amount of energy consumed by the packet processing and forwarding node with respect to the received network packet. The method further includes the packet processing and forwarding node modifying the received network packet to include the generated aggregate energy consumption value. The method further includes the packet processing and forwarding node forwarding the modified network packet to a second node. The packet processing and forwarding node includes a processor coupled to a transmitter and a receiver.

According to exemplary embodiments, a method, performed by a communication device, provides for determining an amount of energy consumed by nodes within a network with respect to the transmission of a media content item to the communication device. The method includes receiving, by the communication device, a plurality of network packets. Each of the plurality of network packets contains a portion of the media content item and an aggregate energy consumption value. The method further includes, for each received network packet, extracting, by the communication device, the aggregate energy consumption value contained in said packet. The method further includes summing, by the communication device, the extracted aggregate energy consumption values to produce a total energy consumption value.

According to exemplary embodiments, a packet processing and forwarding node includes a processor, a computer readable medium coupled to the processor, and the computer readable medium containing instructions executable by the processor. The packet processing and forwarding node is operative to receive a network packet including an energy consumption value. The packet processing and forwarding node is operative to determine an amount of energy consumed by the packet processing and forwarding node with respect to the received network packet. The packet processing and forwarding node is operative to generate an aggregate energy consumption value using the energy consumption value and a value corresponding to the determined amount of energy consumed by the packet processing and forwarding node with respect to the received network packet. The packet processing and forwarding node is operative to modify the received network packet to include the generated aggregate energy consumption value. The packet processing and forwarding node is operative to forward the modified network packet to a second node.

According to exemplary embodiments, a communication device includes a processor and a computer readable medium coupled to the processor. The computer readable medium contains instructions that are executable by the processor. The communication device is operative to receive a plurality of network packets. Each of the plurality of network packets contains a portion of the media content item and an aggregate energy consumption value. The communication device is operative, for each received network packet, to extract the aggregate energy consumption value contained in the packet. The communication device is operative to sum the extracted aggregate energy consumption values to produce a total energy consumption value.

DETAILED DESCRIPTION

This disclosure relates to determining energy consumption associated with sending content (e.g., media content, such as a video file, audio file, etc.) across a network. In embodiments, the present invention allows for packet processing and forwarding nodes (e.g., bridges, switches, routers, etc.) within a network to calculate an aggregate energy consumption value for each network packet that the packet processing and forwarding node processes. In embodiments, a packet processing and forwarding node (or "node" for short) (i) receives from a neighboring node at least one network packet including an energy consumption value determined by the neighboring node; (ii) determines how much energy it consumes by processing the network packet (e.g., to receive, examine, and forward); (iii) adds the determined energy consumption value to the received energy consumption value to generate a new aggregated energy consumption value; (iv) replaces, in the network packet, the received energy consumption value with the new aggregated energy consumption value; and (v) forwards the network packet with the new aggregated energy consumption to the next device (e.g., another network node, communication device, server, etc.).

Not only does the present invention provide for determining an aggregate energy consumption value relating to the total amount of energy consumed in the transmission of content through the entire network, the present invention also provides additional features, such as: (i) optimizing the network to consume less energy to transmit network packets; (ii) prioritizing data packets for routing based on their energy consumption; and/or (iii) providing for display on a communication device (e.g., a laptop, monitor, smart phone, etc.) information relating to how much energy was consumed to transmit media content received by the communication device. Thus, the present invention provides for determining an aggregate energy consumption value as well providing users of a network with information that makes them aware of how much energy is being consumed to transmit and/or receive content through the network.

Figure 1:
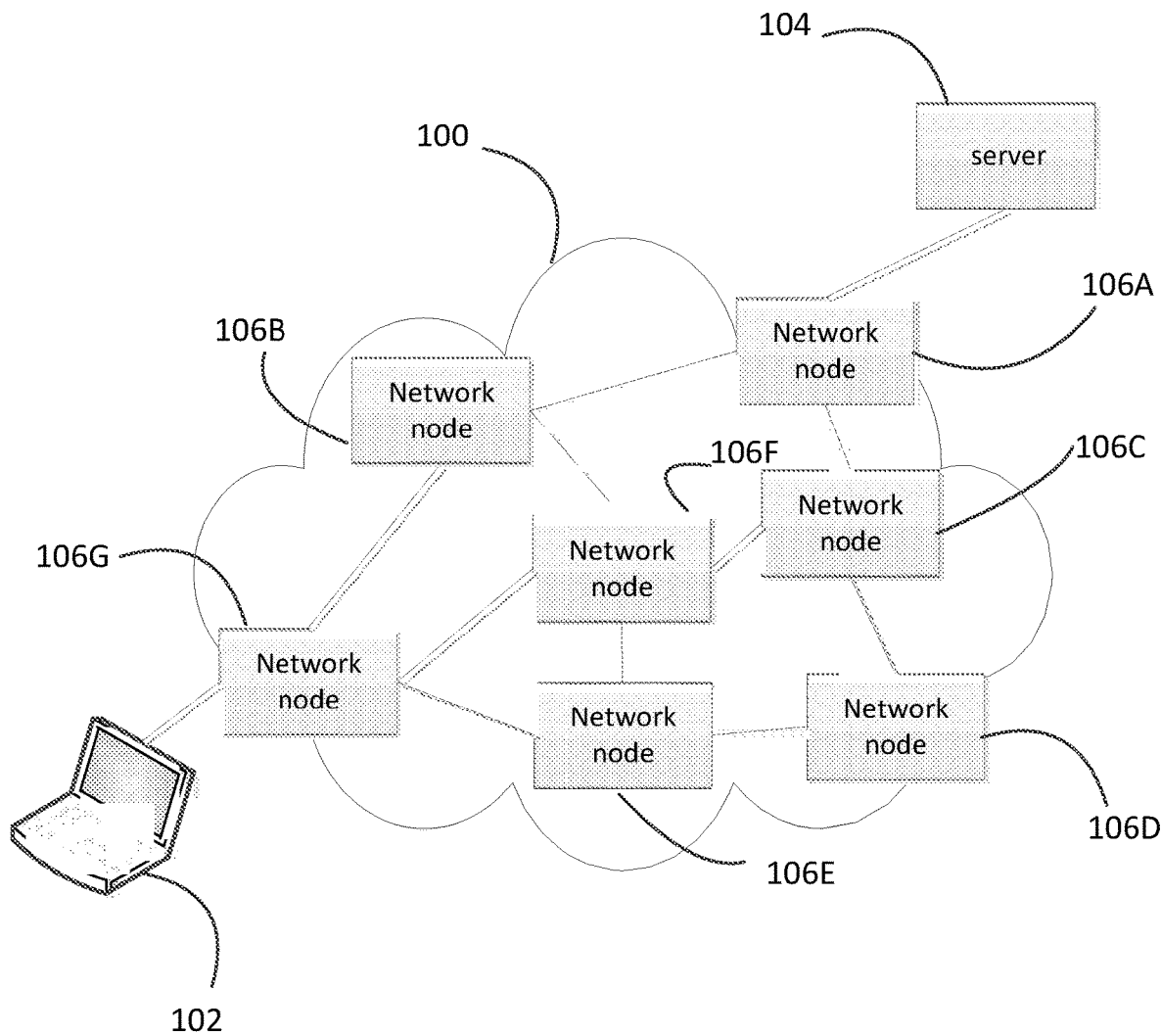
FIG. 1 shows an example network.

FIG. 1 shows an example network in accordance with aspects of the present invention. FIG. 1 includes a network 100, a communication device 102, a server 104, and nodes 106A, 106B, 106C, 106D, 106E, 106F, and 106G (also collectively known in the plural as nodes 106). In embodiments, network 100 may be a cellular network, a second generation (2G) network, a third generation (3G) network, a fourth generation (4G) network, a local area network (LAN), a wide area network (WAN), a telephone network (e.g., Public Switched Telephone Network (PSTN)), the Internet, a satellite network, a GPS network, a fiber optic network, and/or combination of these or other types of networks. In embodiments, communication device 102 may be a laptop, smart phone, cell phone, television, digital receiver, and/or any other type of device that allows a user to input a request for media content. In embodiments, media content may be video, audio, graphics, text, and/or any other type of content that can be transmitted across a network. In embodiments, nodes 106 may be switches, routers, bridges, and/or any other type of device to forward/transmit information/content through a network. In embodiments, nodes 106 include one or more modules that can determine energy consumption, estimate energy consumption of other network nodes, determine path computation based on path costs and energy, and/or prioritize network packets based on energy consumption.

In embodiments, communication device 102 requests content from server 104. The request may be sent through network 100 via nodes 106. In embodiments, server 104 may receive the request and send the content as one or more network packets to communication device 102 through network 100 via nodes 106. In embodiments, the network packets may be transmitted using Internet Protocol version 4 (IPv4), Internet Protocol version 6 (IPv6), and/or any other type of transmission protocol. In embodiments, one or more of nodes 106 determines how much energy is consumed to forward one or more network packets to another one of nodes 106.

For example, node 106A receives a network packet from server 104 and forwards the packet to node 106B. In embodiments, node 106A determines an amount of energy (e.g., 0.01 watts, 0.02 watts, etc.) consumed by node 106A in processing the packet (e.g., receiving the packet, buffering the packet, examining the packet, and/or transmitting the packet). In embodiments, node 106A adds this determined energy consumption value to an energy consumption value (if any) in a header within the network packet to produce an aggregate energy consumption value and send the network packet with the aggregate energy consumption value to node 106B. In embodiments, the energy consumption may be included within an extended IP packet structure that allows for a packet header (e.g., IPv4 packet header, IPv6 packet header, etc.) to keep track of energy consumption. In embodiments, the extended IP packet structure may include a fixed header or an extension header to allow a network packet to store energy consumption information. In embodiments, an extension header may include a "Hop-by-Hop Options" extension that can be examined by nodes on a network packet's path, including sending and receiving nodes.

Additionally, in embodiments, node 106B receives a network packet from node 106a. In embodiments, node 106B determines an amount of energy consumed by node 106B in processing the packet. In embodiments, node 106B adds this determined energy consumption value to an energy consumption value in a header within the network packet to produce an aggregate energy consumption value and send the network packet with the aggregate energy consumption value to node 106G. In embodiments, node 106G may also add its determined energy consumption to the aggregate energy consumption value received from node 106B. In embodiments, node 106G sends the packet with the further updated aggregate energy consumption value to communication device 102.

After communication device 102 receives the packet, a process running on communication device 102 extracts and stores the aggregate energy consumption value. When communication device 102 receives another packet related to the first packet, communication device 102 extracts, from this second packet, the aggregated energy consumption and sums this new aggregated energy consumption value with the stored aggregated energy consumption value in order to determine a total energy consumption. In this way, communication device 102 can generate a total energy consumption value for all the packets associated with a particular transmitted content, and thereby determine the total amount of energy that was consumed in transmitting a media content item through the network.

While FIG. 1 describes each of the network nodes 106 as having the ability to determine energy consumption values, there may be network nodes within a network that cannot determine energy consumption values. In such a situation, other network nodes, that are capable of determining energy consumption values, may determine the energy consumption in a manner described in FIG. 4. Furthermore, while FIG. 1 describes network packets, the network packets may also be described as data packet, packets, data, and/or any other division of content/information that can be transmitted across a network.

In alternate embodiments, server 104 may also determine the amount of energy to transmit one or more packets from server 104 to a first network node within a network. As such, when a packet is received by the first network node, the packet may already have an energy value stored within the packet regarding the amount of energy consumed by server 104 in transmitting the network packet.

FIGS. 2-5 are example flow diagrams in accordance with aspects of the present invention. While a series of blocks have been described with regards to FIGS. 2-5, the blocks and/or the order of the blocks in FIGS. 2-5 may be modified in some embodiments. Further, in FIGS. 2-5, non-dependent blocks may be performed in parallel.

Figure 2:
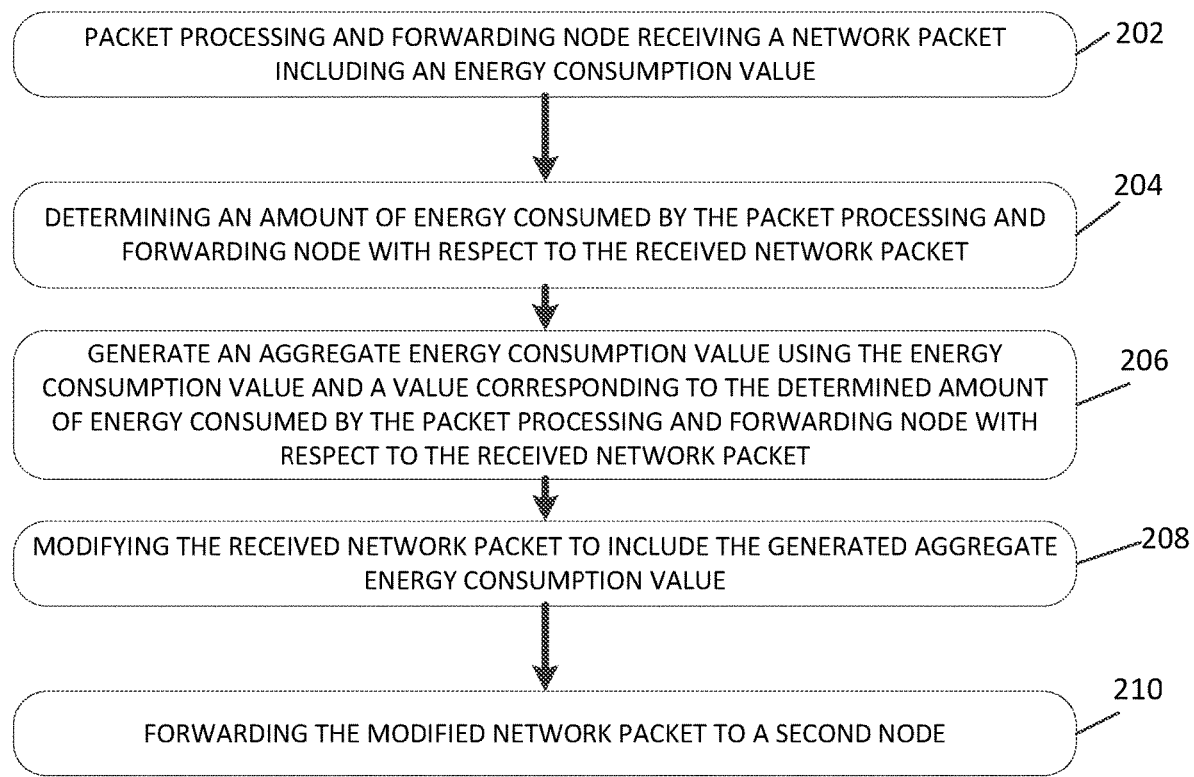
FIGS. 2-5 show example flow diagrams.

FIG. 2 describes an example flow diagram for a method to determine an aggregate energy consumption value associated with sending a network packet across a network. In embodiments, the method is performed by a node 106 (e.g., node 106A, 106B, etc.) as described in FIG. 1.

At step 202, the method includes receiving, by node 106, a network packet that includes an energy consumption value. At step 204, the method includes determining, by node 106, an amount of energy consumed by the node 106 with respect to the received network node. In embodiments, the amount of energy consumed by the packet may be in watts, joules, calories, etc.

At step 206, the method may include generating, by node 106, an aggregate energy consumption value by using the energy consumption value and a value corresponding to the determined amount of energy consumed by node 106 with respect to the received packet. In embodiments, node 106 adds the aggregate energy consumption value and the value corresponding to the determined amount of energy.

At step 208, the method includes node 106 modifying the received network packet to include the generated aggregate energy consumption value. In embodiments, node 106 replaces the energy consumption value with the generated aggregate energy consumption value within a field (e.g., a header as described in FIG. 1) within the packet. In embodiments, the packet (e.g., energy aware packet) that includes energy consumption values may be greater in data size than a packet that does not include energy consumption values. At step 210, the method includes node 106 to forward the modified packet to a second node.

While FIG. 2 describes including aggregate energy consumption value in a network packet, node 106 may also determine geographic information and store that geographic information within the network packet. For example, node 106 may be located in Germany and may include that information in the network packet. As a result, communication device 102 may display geographic locations associated with the transmission of the content for use in determining levels of privacy and/or security.

Figure 3:
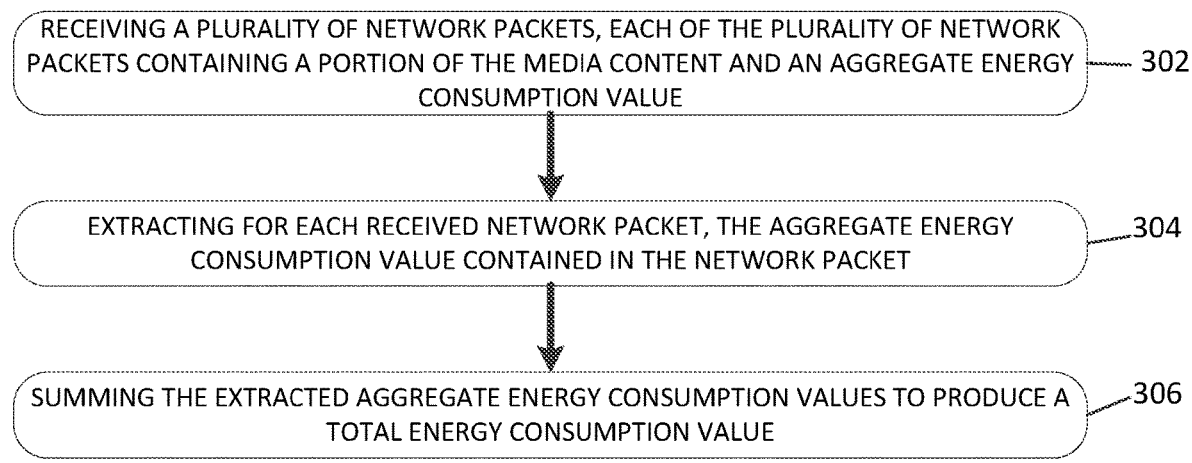

FIG. 3 may describe a flow diagram of a method for determining an amount of energy consumed by nodes within a network with respect to the transmission of media content to the communication device 102. In embodiments, the method may be performed by communication device 102 as described in FIG. 1. In alternate embodiments, one or more of the steps performed by communication device 102 may be performed by network nodes 106 and/or server 104, as described in FIG. 1.

At step 302, the method includes receiving, by communication device 102, a plurality of packets that contain a portion of the media content item and an aggregate energy consumption value. At step 304, the method includes extracting, by communication device 102, the aggregate energy consumption value for each of the received packets. At step 306, the method includes summing, by communication device 102, the extracted aggregated energy consumption values to produce a total energy consumption value for all the network packets (each network packet including an aggregate energy consumption value) associated with the requested media content. The total energy consumption value is then assigned to a category for display, as further described in FIG. 7.

Figure 4:
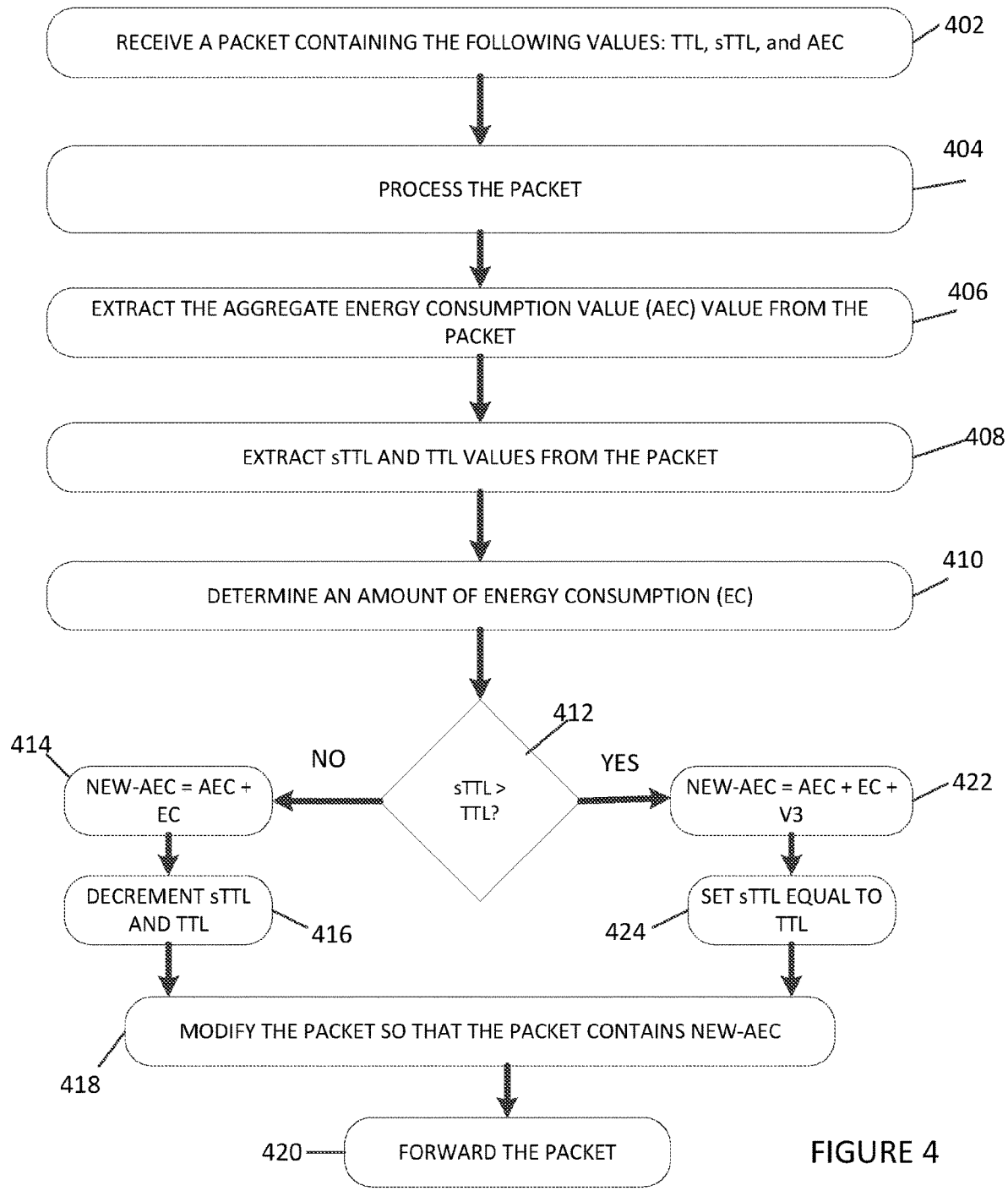

FIG. 4 may describe a flow diagram of a method for estimating an energy consumption value for network nodes that cannot determine the amount of energy needed to send one or more network packets. In embodiments, the method may be performed by a node 106 (e.g., packet processing and forwarding node) as described in FIG. 1.

At step 402, the method includes receiving, by node 106, a network packet. In embodiments, the packet (e.g., network packet) may include a time to live (TTL) value, second TTL (sTTL) value, and an aggregated energy consumption value. At step 404, the method includes processing, by node 106, the packet. In embodiments, the processing may include determining the type of information included in the packet, such as the TTL value, the sTTL value, the aggregated energy consumption value, etc. At step 406, the method includes extracting, by node 106, the aggregated energy consumption value.

At step 408, the method includes extracting, by node 106, the TTL and the sTTL values. At step 410, the method includes determining, by node 106, an amount of energy consumed by node 106 to forward the packet. In embodiments, the determined amount of energy consumed is described in FIGS. 1 and 2.

At step 412, the method includes choosing one of two ways to determine a new aggregated energy consumption based on whether the sTTL value is greater or less than the TTL value. If the sTTL value is not greater than the TTL value (step 412—NO), then at step 414, the method includes node 106 determining the new aggregated energy consumption value by adding the received aggregated energy consumption value to the energy consumption value, determined at step 408. In embodiments, the sTTL value being equal to the TTL value indicates to node 106 that the previous node was able to determine its energy consumption value.

At step 416, the method includes node 106 decrementing (e.g., by one) both the sTTL and the TTL values. For example, if the sTTL and the TTL are both five, then node 106 decrements both values to four. At step 418, the method includes node 106 modifying the packet to include the new aggregated energy consumption value as described in FIG. 1. At step 420, the method includes node 106 forwarding the packet to node 106 or to device, such as communication device 102 or server 104, as described in FIG. 1.

If the sTTL value is greater than the TTL value (step 412—YES), then at step 422, node 106 determines a new aggregated energy consumption value by adding the received aggregated energy consumption value (as described in step 402), the determined energy consumed value (as described in step 408), and an estimated value (v3).

In embodiments, since the sTTL is greater than the TTL, this indicates to node 106 that a previous node was unable to determine its own energy consumption needed to forward/transmit the network packet through the network. In embodiments, the estimated value, v3, is node 106 estimating an energy consumption value for a node that previously received the packet and was unable to determine its own energy consumption to forward that packet through the network. In embodiments, v3 is determined by the following example formula of (sTTL−TTL)*average energy consumption. In embodiments, the average energy consumption may be a predefined value calculated by collecting consumption data from one or more different types of network devices (e.g., routers, bridges, switches, etc.) and averaging those values.

At step 424, the method includes node 106 setting the sTTL equal to TTL and then decreases sTTL and TTL by one. At step 418, the method includes node 106 modifying the packet with the new aggregated energy consumption value; and forwarding, at step 420, the packet to another node 106.

Figure 5:
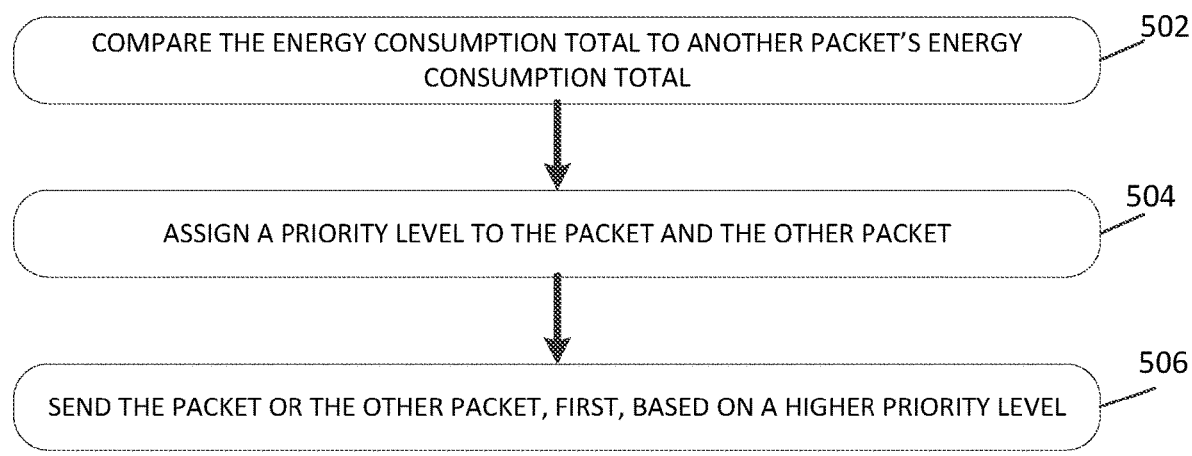

FIG. 5 may describe a flow diagram for a method to prioritize different network packets based on assigning a priority level to each network packet based on energy consumptions. In embodiments, the method described in FIG. 5 is performed by a packet processing and forwarding node, such as node 106. In further embodiments, the method described in FIG. 5 is performed by a central packet processing and forwarding node that may receive all the network packets within a network.

At step 502, the method includes node 106 comparing the aggregated energy consumption value of one received packet to another received packet's aggregated energy consumption value. At step 504, the method includes node 106 assigning priority levels to the packets. In embodiments, the priority levels are based on the aggregated energy consumption values and a packet with a lower aggregated energy consumption value can receive a higher priority within a queue than a packet given a lower priority level based on a higher aggregated energy consumption value. Thus, the packet processing and forwarding node then assigns the network packets in an order within a queue based on the priority levels.

In embodiments, node 106 uses distance (e.g., number of hops) that a network packet has travelled into determining priority. For example, node 106 uses a module to determine average energy consumption per packet computation element (PCE) that the network packet has been routed through to determine priority. At step 506, the method includes node 106 sending the packet or the other packet, first within the queue, based on the packet having the higher priority level.

Figure 6:
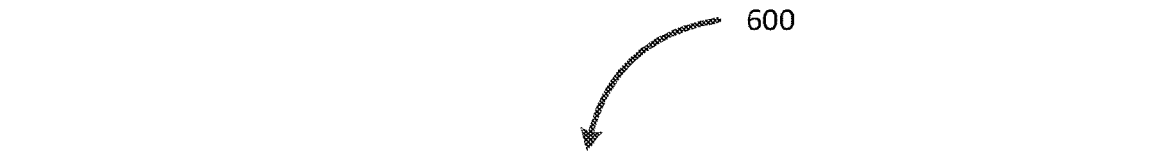
FIGS. 6-7 show example data structures.

FIG. 6 is an example data structure 600 that allows for a node 106 (e.g., a packet processing and forwarding node) to determine whether routing costs or energy consumption values should be given greater weight in determining the routing of a packet. As shown in FIG. 6, accumulated consumption values 602 shows different ranges of aggregated energy consumption values (e.g., in watts, joules, etc.), such as from 0 to 0.9, 1 to 1.9, 2 to 2.9, etc. Also, as shown in FIG. 6, $\alpha$ and $\beta$ values 604 show two values. In embodiments, $\alpha$ is a weight factor associated with power consumption and $\beta$ is a weight factor associated with routing cost. In embodiments, the summation of $\alpha$ and $\beta$ is one. In embodiments, the total network path value/cost (S) is equal to $\alpha*$(energy consumption)+$\beta*$(routing cost).

For example, node 106 uses data structure 600 as a look-up table to determine $\alpha$ and $\beta$ values based on the aggregate energy consumption value range. Instead of storing static values (i.e., non-changing values), $\alpha$ and $\beta$ values are dynamically determined by node 106 based on a received aggregate energy consumption value within the packet. For example, if the accumulated (i.e., aggregated) energy consumption value is 0.8, node 106 uses data structure 600 to determine that $\alpha$ and $\beta$ values are 0.9 and 0.1, respectively. In this particular situation, a greater weight is given to the power consumption for determining the network path since than the energy consumption value is at lower value. However, if the energy consumption value was 3.2, then $\alpha$ and $\beta$ values are 0.1 and 0.9, respectively. In this particular situation, a greater weight is given to the routing costs since the energy value is a higher value. Thus, the path computation may be dynamically determined with changing energy consumption values.

Figure 7:
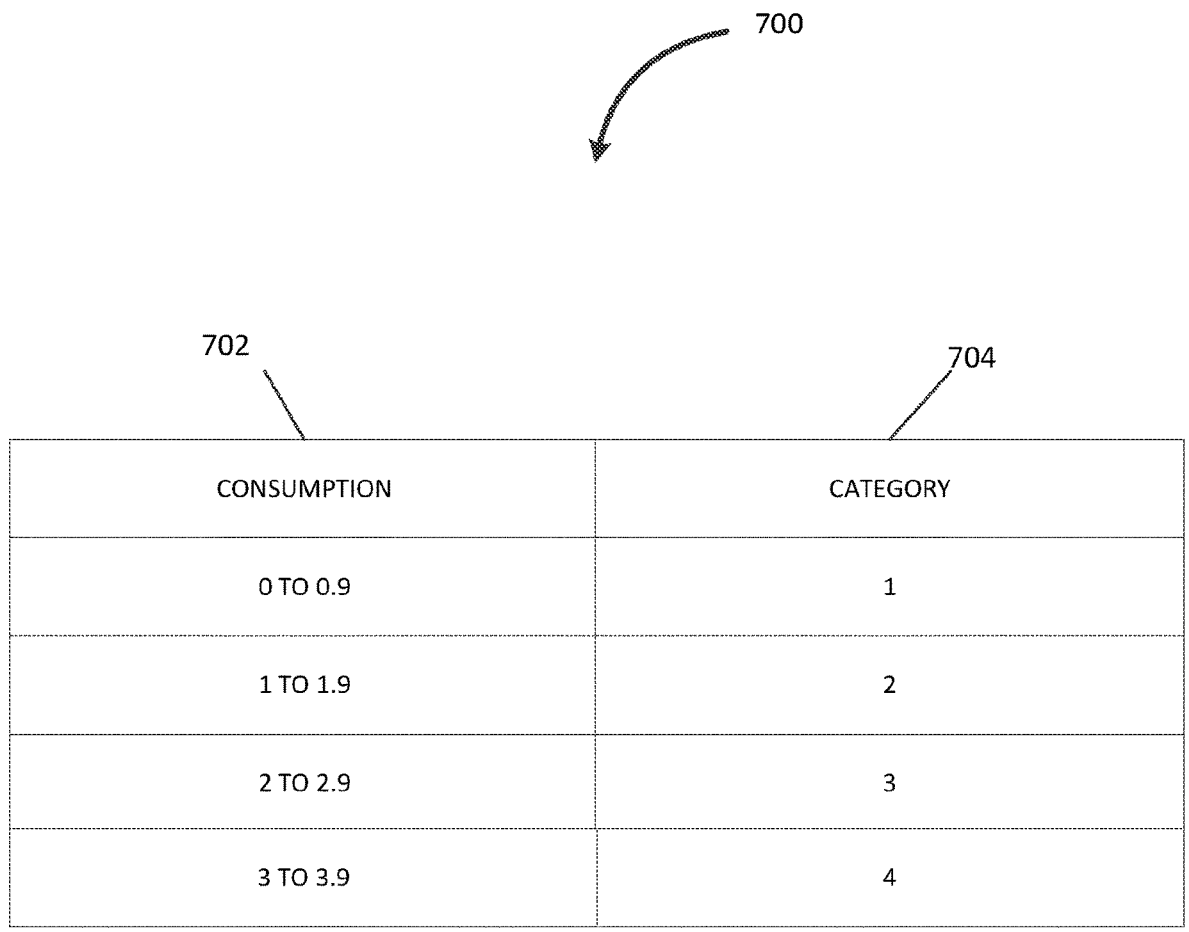

FIG. 7 is an example data structure 700 in accordance with aspects of the present invention. In embodiments, data structure 700 is used by communication device 102 to display energy consumption related information. As shown in FIG. 7, data structure 700 includes energy consumption 702 and category 704. In embodiments, communication device 102 receives the total energy consumption for transmitting content across a network to the communication device. In embodiments, communication device 102 receives the total energy consumption and use the values in consumption 702 to determine an associated category value (e.g., 1, 2, 3, etc.). As such, communication device 102 displays the category value to the user instead of providing the total energy consumption value so as to maintain confidentiality of the energy consumption values. For example, a displayed category "1" indicates to a user, of communication device 102, that the energy consumption is low. Alternatively, a displayed category "4" indicates to the user that the energy consumption is high. Thus, the user uses the displayed information to optimize energy usage by either reducing requests for content through the network or allowing the network operator to use the information to find ways to optimize energy usage within the network (e.g., use network nodes that use less energy).

Figure 8:
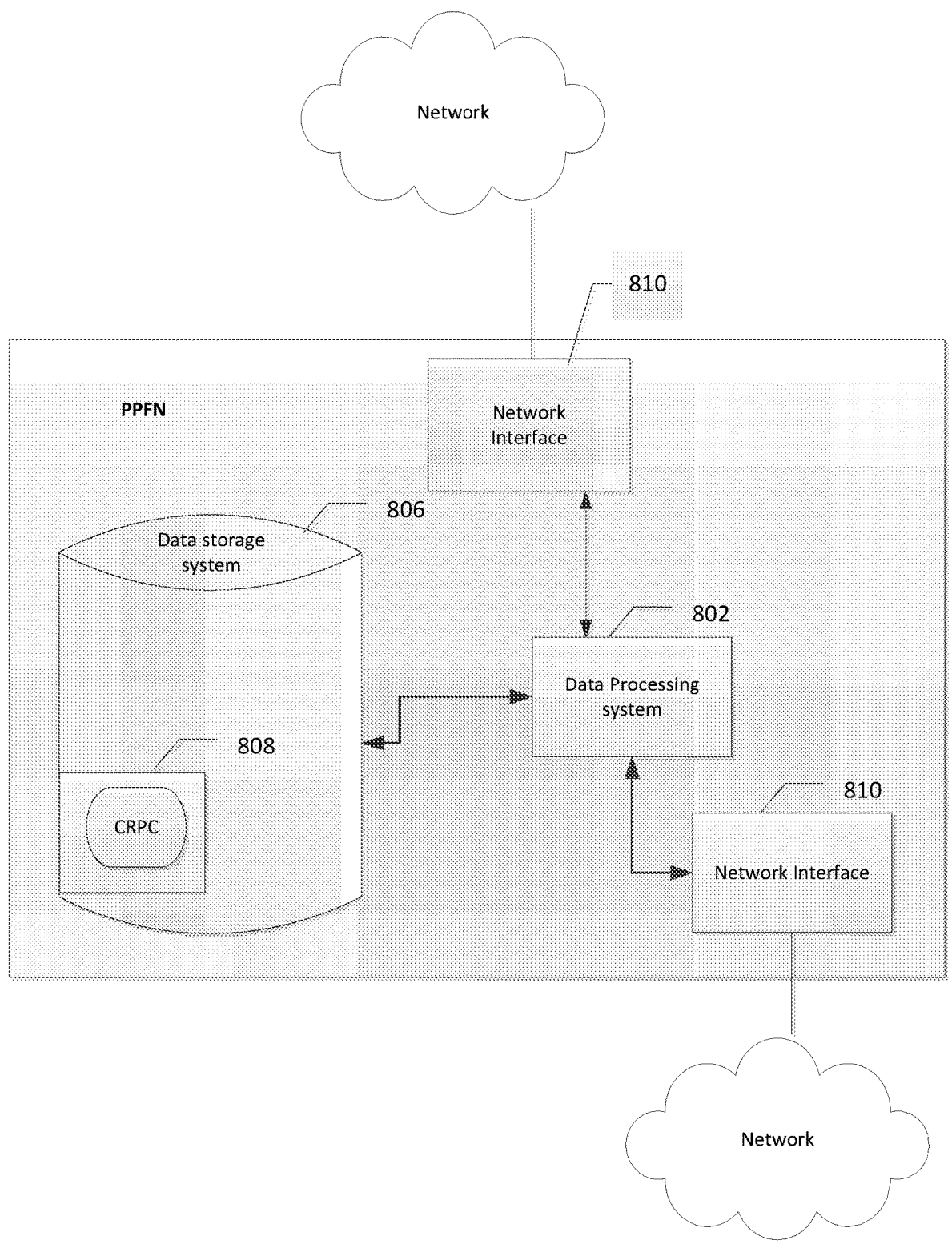
FIG. 8 shows an example wireless communication system.

FIG. 8 illustrates a block diagram of an exemplary access node, such as node 106 as shown in FIG. 1. As shown in FIG. 8, the access node may include: a data processing system 802, which may include one or more microprocessors and/or one or more circuits, such as an application specific integrated circuit (ASIC), field-programmable gate arrays (FPGAs), and the like; a network interface 810; and a data storage system 806, which may include one or more non-volatile storage devices and/or one or more volatile storage devices (e.g., random access memory (RAM)). According to some embodiments, the data processing system 802 may comprise a control unit used for selection of transmission parameters.

In embodiments where data processing system 802 includes a microprocessor, computer readable program code (CRPC) 808 may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 802 to perform steps described above (e.g., steps described above with reference to the flow chart shown in FIGS. 2, 4 and 5). In other embodiments, the access node is configured to perform steps described herein without the need for code. That is, for example, data processing system 802 may consist merely of one or more ASICs. Hence, the features of the embodiments described herein may be implemented in hardware and/or software. For example, in particular embodiments, the functional components of the access node described above may be implemented by data processing system 802 executing computer instructions, by data processing system 802 operating independent of any computer instructions, or by any suitable combination of hardware and/or software.

Figure 9:
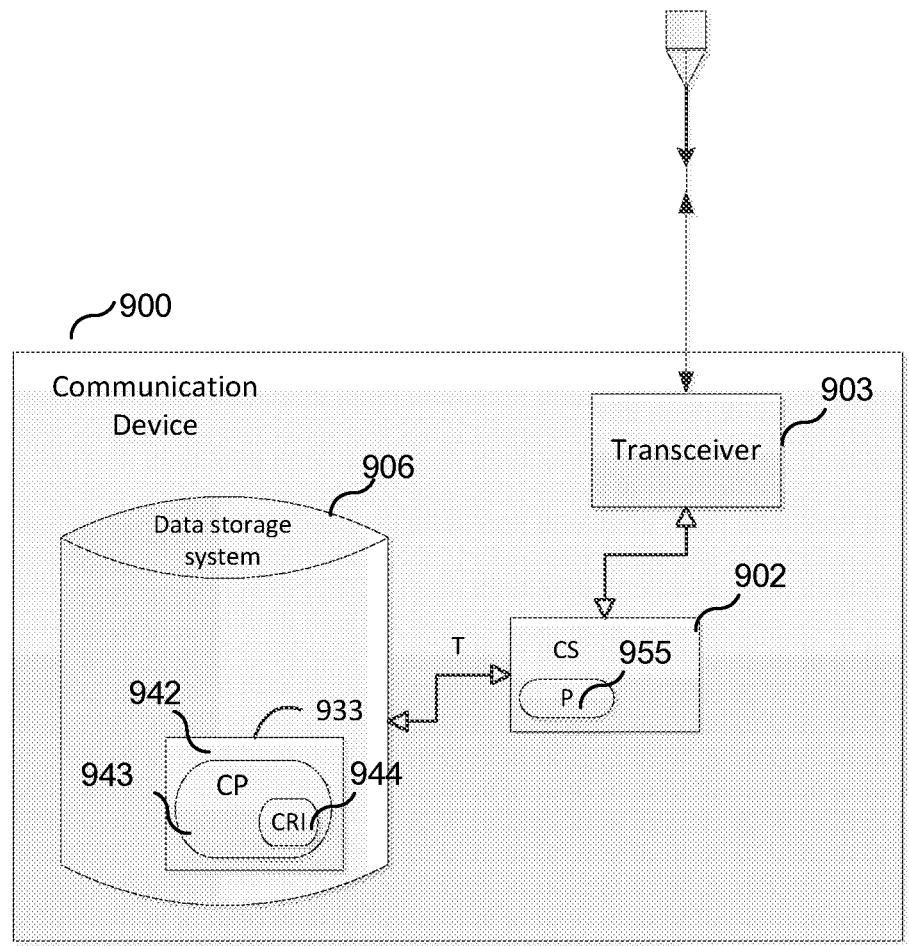
FIG. 9 shows an example device.

FIG. 9 illustrates a block diagram of a communication device 900, such as communication device 102 as described in FIG. 1. For example, the communication device may be a smart-phone, cellular phone, hand-held gaming device, wearable device (e.g., watch, glasses, wristband, etc.), video device, television device, and/or any other type of device capable of performing wireless and/or wired communications.

As shown in FIG. 9, communication device 900 may include or consist of: a computer system (CS) 902, which may include one or more processors 955 (e.g., a general purpose microprocessor) and/or one or more circuits, such as an application specific integrated circuit (ASIC), field-programmable gate arrays (FPGAs), a logic circuit, and the like; a transceiver 903 for use in connecting communication device 900 to a network; and a data storage system 906, which may include one or more non-volatile storage devices and/or one or more volatile storage devices (e.g., random access memory (RAM)). In embodiments where communication device 900 includes a processor 955, a computer program product (CPP) 933 may be provided. CPP 933 includes or is a computer readable medium (CRM) 942 storing a computer program (CP) 943 comprising computer readable instructions (CRI) 944. CRM 942 may include a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 944 of computer program 943 is configured such that when executed by computer system 902, the CRI causes the communication device 900 to perform steps described above (e.g., steps described above with reference to the flow charts and message flows shown in the drawings). In other embodiments, communication device 900 may be configured to perform steps described herein without the need for a computer program. That is, for example, computer system 902 may consist merely of one or more ASICs. Hence, the features of the embodiments described herein may be implemented in hardware and/or software.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method for determining an aggregate energy consumption value associated with sending a network packet across a network, the method comprising:
   a packet processing and forwarding node receiving a network packet comprising an energy consumption value specifying an estimated consumed amount of energy;
   determining, by the packet processing and forwarding node, an amount of energy consumed by the packet processing and forwarding node with respect to the received network packet;
   the packet processing and forwarding node generating an aggregate energy consumption value using the energy consumption value included in the network packet and a value corresponding to the determined amount of energy consumed by the packet processing and forwarding node with respect to the received network packet;
   the packet processing and forwarding node modifying the received network packet to include the generated aggregate energy consumption value; and
   the packet processing and forwarding node forwarding the modified network packet to a second node, wherein
   the packet processing and forwarding node comprises a processor coupled to a transmitter and a receiver,
   the received network packet further comprises a first time to live (TTL) value and a second TTL (sTTL) value,
   the received network packet was transmitted by an upstream node,
   generating the aggregate energy consumption value comprises the packet processing and forwarding node determining whether the sTTL value is equal to the TTL value, and
   generating the aggregate energy consumption value further comprises calculating the aggregate energy consumption value using i) the energy consumption value included in the received network packet, ii) the value corresponding to the determined amount of energy consumed by the packet processing and forwarding node, and iii) a third value (V3) as a result of determining that the sTTL value is not equal to the TTL value.

2. The method of claim 1, wherein
   the modified network packet contains a portion of a media content item,
   the second node is a communication device,
   the communication device is operable to receive the modified network packet along with other network packets comprising other portions of the media content item, one or more of said other network packets also comprising an aggregate energy consumption value, and
   the communication device is configured to use the aggregate energy consumption value included in the modified packet and the aggregate energy consumption values included in said one or more other network packets to determine a total energy consumption value representing an amount of energy consumed in providing the media content item to the communication device.

3. The method of claim 1, wherein
   the second node is a second packet processing and forwarding node, and
   the method further comprises:
   the second packet processing and forwarding node receiving the modified network packet containing the aggregate energy consumption value;
   determining, by the second packet processing and forwarding node, an amount of energy consumed by the second packet processing and forwarding node with respect to the received modified network packet;
   generating, by the second packet processing and forwarding node, a second aggregate energy consumption value using said first recited aggregate energy consumption value and a value corresponding to the determined amount of energy consumed by the second packet processing and forwarding node with respect to the received modified network packet;
   the second packet processing and forwarding node modifying the received modified network packet to include the generated second aggregate energy consumption value; and
   the second packet processing and forwarding node forwarding the further modified network packet to a third node.

4. The method of claim 1, wherein
   $V3=(A)\times(sTTL-TTL)$, wherein A is a predetermined energy consumption value, and
   the method further comprises the packet processing and forwarding node decrementing the sTTL value by a first amount and decrementing the TTL value by a second amount so that the decremented sTTL value equals the decremented TTL value.

5. The method of claim 4, wherein A is a mean energy consumption value.

6. The method claim 1, wherein generating the aggregate energy consumption value comprises summing said first recited aggregate energy consumption value, said value corresponding to the determined amount of energy consumed by the second packet processing and forwarding node, and V3.

7. A packet processing and forwarding node, comprising:
   a processor; and
   a computer readable medium coupled to the processor, said computer readable medium containing instructions executable by the processor, whereby the packet processing and forwarding node is operative to:

receive a network packet comprising an energy consumption value specifying an estimated consumed amount of energy;

determine an amount of energy consumed by the packet processing and forwarding node with respect to the received network packet;

generate an aggregate energy consumption value using the energy consumption value included in the network packet and a value corresponding to the determined amount of energy consumed by the packet processing and forwarding node with respect to the received network packet;

modify the received network packet to include the generated aggregate energy consumption value; and forward the modified network packet to a second node, wherein the received network packet comprises a first time to live (TTL) value and a second TTL (sTTL) value, the packet processing and forwarding node is configured to generate the aggregate energy consumption value by performing a process for generating the aggregate energy consumption value that comprises determining whether the sTTL value is equal to the TTL value, and the process for generating the aggregate energy consumption value further comprises calculating the aggregate energy consumption value using: i) the energy consumption value included in the received network packet, ii) the value corresponding to the determined amount of energy consumed by the packet processing and forwarding node, and iii) a third value (V3), wherein the calculating step is performed as a result of determining that the sTTL value is not equal to the TTL value.

8. A system comprising the packet processing and forwarding node and the second node of claim 7, wherein the modified network packet contains a portion of a media content item, the second node is a communication device, the communication device is operable to receive the modified network packet along with other network packets comprising other portions of the media content item, one or more of said other network packets also comprising an aggregate energy consumption value, and the communication device is configured to use the aggregate energy consumption value included in the modified packet and the aggregate energy consumption values included in said one or more other network packets to determine a total energy consumption value representing an amount of energy consumed in providing the media content item to the communication device.

9. A system comprising the packet processing and forwarding node and the second node of claim 7, wherein the second node is a second packet processing and forwarding node that is operative to:

receive the modified network packet containing the aggregate energy consumption value;

determine an amount of energy consumed by the second packet processing and forwarding node with respect to the received modified network packet;

generate a second aggregate energy consumption value using said first recited aggregate energy consumption value and a value corresponding to the determined amount of energy consumed by the second packet processing and forwarding node with respect to the received modified network packet;

modify the received modified network packet to include the generated second aggregate energy consumption value; and forward the further modified network packet to a third node.

10. The packet processing and forwarding node of claim 7, wherein V3=(A)×(sTTL−TTL), where A is a predetermined energy consumption value.

11. The packet processing and forwarding node of claim 10, wherein A is a mean energy consumption value.

12. The packet processing and forwarding node of claim 7, wherein generating the aggregate energy consumption value comprises summing said first recited aggregate energy consumption value, said value corresponding to the determined amount of energy consumed by the second packet processing and forwarding node, and V3.

* * * * *